US008914640B2

(12) United States Patent
Haddad et al.

(10) Patent No.: US 8,914,640 B2
(45) Date of Patent: Dec. 16, 2014

(54) SYSTEM FOR EXCHANGING DATA BETWEEN AT LEAST ONE SENDER AND ONE RECEIVER

(76) Inventors: Mouchi Haddad, Champigny sur Marne (FR); Pierre Brejaud, Villiers le Bel (FR); Mikaël Haddad, Montpellier (FR)

( * ) Notice: Subject to any disclaimer, the term of this patent is extended or adjusted under 35 U.S.C. 154(b) by 79 days.

(21) Appl. No.: 13/876,039

(22) PCT Filed: Sep. 27, 2011

(86) PCT No.: PCT/FR2011/052260
§ 371 (c)(1),
(2), (4) Date: Mar. 26, 2013

(87) PCT Pub. No.: WO2012/042170
PCT Pub. Date: Apr. 5, 2012

(65) Prior Publication Data
US 2013/0191646 A1    Jul. 25, 2013

(30) Foreign Application Priority Data

Sep. 28, 2010   (FR) ...................................... 10 57785

(51) Int. Cl.
*H04L 9/32* (2006.01)
*H04L 9/12* (2006.01)

(52) U.S. Cl.
CPC ............... *H04L 9/12* (2013.01); *H04L 9/3247* (2013.01)
USPC ......................................... 713/176; 713/150

(58) Field of Classification Search
CPC .............................. H04L 9/32; H04L 9/3247
USPC ................................................. 713/176, 150
See application file for complete search history.

(56) References Cited

U.S. PATENT DOCUMENTS

| 6,041,409 | A  | * | 3/2000 | Zunquan ......................... 713/176 |
| 6,907,123 | B1 | * | 6/2005 | Schier .............................. 380/28 |
| 7,213,005 | B2 | * | 5/2007 | Mourad et al. ................... 705/64 |
| 7,487,128 | B2 | * | 2/2009 | Spagna et al. ................... 705/51 |
| 7,519,178 | B1 | * | 4/2009 | Matyas et al. ................... 380/44 |
| 7,706,540 | B2 | * | 4/2010 | Fransdonk ...................... 380/279 |
| 7,937,588 | B2 | * | 5/2011 | Picard et al. .................... 713/176 |
| 8,639,062 | B2 | * | 1/2014 | Calman et al. ................ 382/305 |
| 2002/0138735 | A1 | * | 9/2002 | Felt et al. ........................ 713/176 |
| 2005/0154896 | A1 |   | 7/2005 | Widman et al. ................ 713/182 |
| 2006/0018478 | A1 |   | 1/2006 | Diefenderfer et al. ........ 380/259 |
| 2006/0184796 | A1 | * | 8/2006 | Fahrny ........................... 713/176 |

(Continued)

FOREIGN PATENT DOCUMENTS

| EP | 0 898 260 | 2/1999 | ............... G09C 1/00 |
| WO | WO 2007/043014 | 4/2007 | ............... H04L 9/12 |

OTHER PUBLICATIONS

International Search Report for International Application No. PCT/FR2011/052260, Nov. 18, 2011.

*Primary Examiner* — Haresh N Patel
(74) *Attorney, Agent, or Firm* — Kusner & Jaffe

(57) ABSTRACT

The invention relates to a system for exchanging data between at least one sender and one receiver, such as a central server, by means of a data transmission network of Internet type, this system comprising means for encrypting/decrypting the data exchanged. The senders and the receiver comprise generators of encryption/decryption keys, which generators are synchronized to generate new keys for message encryption/decryption with each dispatching of a new message from the sender to the receiver.

20 Claims, 3 Drawing Sheets

(56) References Cited

U.S. PATENT DOCUMENTS

2008/0091945 A1* 4/2008 Princen et al. ............... 713/170
2009/0254744 A1* 10/2009 Carr ............................... 713/150
2010/0275025 A1* 10/2010 Parkinson ..................... 713/176
2011/0246780 A1* 10/2011 Yeap et al. .................... 713/176

* cited by examiner

SYSTEM FOR EXCHANGING DATA BETWEEN AT LEAST ONE SENDER AND ONE RECEIVER

FIELD OF THE INVENTION

This invention relates to a system for exchange of data between at least one "sending" computer terminal or system and at least one "receiving" computer terminal or system, by means of an Internet-type data transmission network.

BACKGROUND OF THE INVENTION

The sending systems may, for example, be different point-of-sale checkout stations, which must be capable of communicating with a central server (the receiver), in particular for the management of inventory or the consolidation of sales made.

In the case of a company that is geographically extended, the different checkout stations can be linked to a central server by means of network operators, via telecommunications lines that may be either private or public.

The private lines, also called VPN (Virtual Private Network), are used to form the company's internal network or Intranet. The company's Intranet has the advantage of being capable of being entirely secured since all of the access points are determined in advance and may comprise internal security devices defined by the company.

The public lines may be used for relationships with partner companies, via an Extranet-type network. Access to these lines is achieved by means of a public network operator of the ISP (Internet Service Provider) type. The company's Extranet is also capable of being entirely secured since each partner can be identified by means of a Certification Authority (CA), and the connection between each partner and the company can be considered to be private (equivalent to a VPN-type line), even if it is part of the public network.

These professional solutions (Intranet, Extranet) remain complex and expensive to implement operationally in companies.

The public lines may also be used for random dealings and on demand with all of the clients and prospective clients of the company, via the Internet. The Internet does not have a specific security device, although passwords and technologies for access to a server can be used, but without guaranteeing bilateral security between a client and a server. Indeed, any access point of the public network having knowledge of the password securing devices can access the information exchanged.

These devices do not therefore guarantee the degree of security desirable for company data exchanges over the Internet-type network.

Moreover, an Internet-type network does not guarantee that the data received by the receiver remains consistent with that initially transmitted by the corresponding sender because of the risk of involuntary corruption of frames transmitted by such a network based on IP (Internet Protocol) technology.

To overcome this lack of security over the Internet-type network, different solutions for securing access and data exchanges that use technologies based on a set of mathematical encryption models of the RSA, SSL, HTTPS type and so on, have been developed.

These encryption techniques do not always make it possible to guarantee sufficient security of exchanges between clients and the server, in particular when these exchanges are performed interactively.

It has indeed been noted that these devices can be fooled by access points of the public network for the purposes of corruption, destruction or espionage of company data.

To minimise these risks, exchanges are limited by the use of transaction files, i.e. files combining information or movements that have appeared during a given time period.

It is, however, increasingly necessary to be capable of using, in an entirely secure and interactive manner, public Internet-type telecommunication networks that have the following advantages:
  no network-related transmission cost for the company,
  global access without any additional cost open to the company,
  high current available bandwidth on the networks,
  permanent availability making it possible to maintain, at any time, proper operation of the data exchange system.

The imperatives for computer security on the Internet concern four main points:
  integrity, to guarantee that the data is not modified during its transmission (including even the case of involuntary corruption based on IP frames transmitted, then received);
  confidentiality, to guarantee that only those involved in a data exchange are capable of understanding the data exchanged;
  non-repudiation, to guarantee that the sender of a message cannot later deny having sent said message;
  authentication, to verify that a message received comes from an authorised person.

SUMMARY OF THE INVENTION

The invention is intended in particular to respond to these needs in a simple, effective and economical manner, by enabling a public Internet-type network to be used in an entirely secure and interactive manner.

To this end, it proposes a system for exchange of data between at least one sender and one receiver such as a central server, by means of an Internet-type data transmission network, characterised in that the sender and the receiver each include first means for encryption/decryption of messages, these first encryption/decryption means being designed to generate, on the basis of data including at least one variable data item and secret codes specific to the sender and the receiver, variable encryption/decryption keys that change for each new sending of a message from the sender to the receiver, with the encryption and decryption of the messages being performed without the transmission of these keys or data relating to these keys between the sender and the receiver.

Thus, according to the invention, the encryption/decryption keys are constantly being modified and are used without these keys and the data for obtaining them being exchanged or transmitted between the sender and the receiver, so that an intruder, even with means for encryption/decryption identical to those of the sender and the receiver, cannot decipher the messages transmitted.

According to another feature of the invention, the first encryption/decryption means of the sender and the receiver include pseudo-random key generators that are identical and synchronised.

Key generators typically include one-way hash functions, which generate encryption/decryption keys on the basis of fixed and variable data, the fixed data advantageously including, aside from the secret codes of the sender and the receiver, other fixed data such as, for example, symbolic codes specific to the sender and the receiver, with the fixed data preferably being mixed, for example by concatenation, in order to further increase the security.

The use of variable data, in particular synchronisation data set to an initial state before any exchange and systematically variable then in each exchange, such as an operation number initially at zero and then incremented for each exchange performed, and which can optionally be associated, for example, with a date updated after each of said exchanges (a date is also a variable data item but, by nature, it is not systematically different in each exchange), makes it possible, on the one hand, to generate keys that will be different each time and, on the other hand, to synchronise the key generators of the sender and the receiver in order to cause them to generate associated keys for encryption/decryption of the new messages, without there being an exchange or transmission of data relating to these keys between the sender and the receiver.

The system according to the invention also includes means for resetting the synchronisation data to the initial state, such as, for example, means for resetting an operation number to zero, in order to ensure resynchronisation of the key generators after an interruption in the sender-receiver connection, this interruption being capable of occurring involuntarily, for example in the event of a connection failure.

Advantageously, the sender includes means for signing each message transmitted by the receiver, for authentication of the sender upon receipt of a message by the receiver.

This characteristic responds to the aforementioned criteria of non-repudiation and authentication.

The signature means advantageously include a signature key generator, such as a pseudo-random generator of the type mentioned above, which can generate variable signature keys on each operation, for example on the basis of the same fixed and variable data as the encryption/decryption key generators.

Preferably, the encryption of a message is performed after said message has been signed.

Additionally, the receiver includes means for authenticating the sender of a message received and deciphered, these means including a key generator identical to the signature key generator and generating keys on the basis of the aforementioned fixed and variable data.

The generators of the signature keys and the authentication means can thus be synchronised by incrementation of a synchronisation data item identical to that of the sender, such as the operation number, with said synchronisation data being reset to the initial state both for the receiver and the sender, if the sender-receiver connection is interrupted.

According to yet another feature of the invention, the receiver includes means intended to generate, after receiving and decryption of a message sent by the sender, an encrypted acknowledgement message sent to the sender.

The acknowledgement enables the sender to be sure that the message indeed reached the receiver, before a new message is sent, for example.

More specifically, the means for generating an acknowledgement message include means for encryption of an acknowledgement code, which is, for example, the date of the last acknowledgement provided by the receiver, by means of a key produced by a key generator on the basis of the aforementioned fixed data.

The sender includes means for decryption of the acknowledgement message sent by the receiver, by means of a decryption key produced by a key generator identical to that of the receiver, on the basis of the aforementioned fixed data.

The acknowledgement code deciphered by the sender can then be used as a new variable data item associated with the synchronisation data, to generate keys for signing and encrypting the next message to be sent to the receiver.

According to another feature of the invention, the data exchange system includes means for checking the integrity and the non-repudiation of each message transmitted, by adding to each message, before encryption, the number of characters (length) of the message, and a fingerprint obtained by hashing the set (message and length), then by verification by means of the fingerprint and then the length of the message after decryption.

The hashing is, for example, performed by means of an SHA-type algorithm.

Advantageously, the encryption are performed by means of an AES-type (Advanced Encryption Standard) or DES-type (Data Encryption Standard) algorithm, which are block encryption algorithms.

The invention also relates to a method for exchange of encrypted data between a sender and a receiver, this method consisting of encrypting, in the sender, messages to be transmitted to the receiver by an Internet-type network, decrypting, in the receiver, the messages received, and returning an acknowledgement message to the sender, characterised in that the messages are encrypted by means of a symmetric secret key algorithm; it consists of generating, in the sender and in the receiver, variable encryption/decryption keys that are modified in each encryption/decryption and that are produced by identical and synchronised key generators installed in the sender and in the receiver, these keys being generated on the basis of fixed data including secret codes specific to the sender and to the receiver and at least one synchronisation data item that is systematically variable in each exchange, such as an operation number, with the encryption and decryption of the messages being performed without transmission of these keys or data relating to these keys between the sender and the receiver.

According to another feature of the invention, this method also consists, in the sender, of signing each message before encryption, using a signature key produced by a pseudo-random key generator and, in the receiver, of authenticating the sender by using an authentication key produced by a pseudo-random key generator, with the generators of signature and authentication keys being identical and synchronised.

The method also consists of synchronising, by incrementation of a synchronisation data item that is systematically variable in each exchange, such as an operation number, the encryption/decryption and/or signature and authentication key generators, with said synchronisation data being reset to the initial state if the connection between the sender and the receiver fails.

In addition, the acknowledgement message sent to the sender after receiving and decryption of a message contains an acknowledgement code, for example the date of the last acknowledgement provided by the receiver, which is sent in encrypted form to the sender and which is used in the receiver and after decryption in the sender, as a new data item associated with the synchronisation data for the generation of a new variable key by the first encryption/decryption means.

BRIEF DESCRIPTION OF THE DRAWINGS

The invention will be easier to understand, and other details, features and advantages of the invention will appear in view of the following description, provided as a non-limiting example, with reference to the appended drawings, wherein.

DETAILED DESCRIPTION OF THE INVENTION

Figure 1:
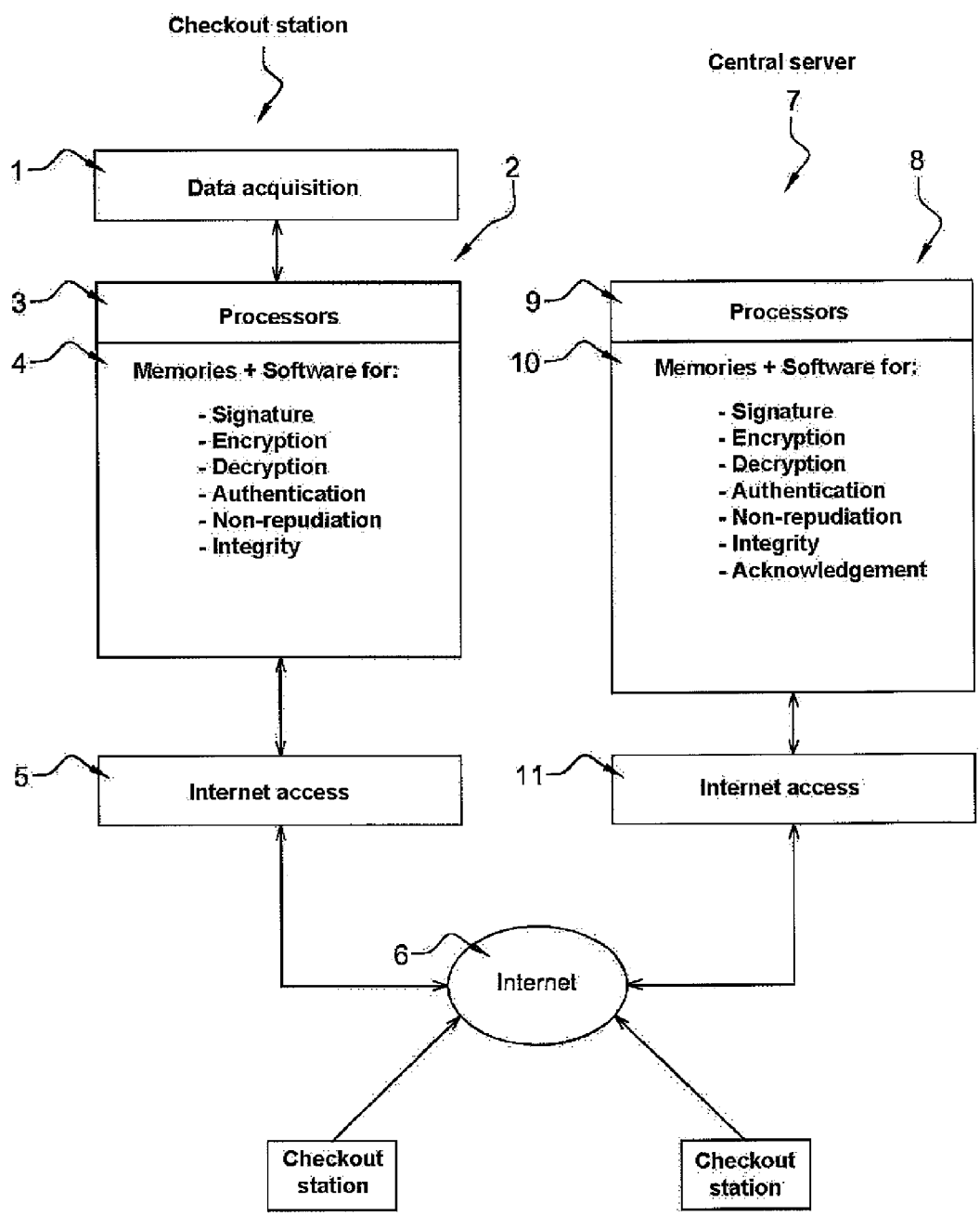
FIG. 1 diagrammatically shows the essential means of the system according to the invention.

FIG. 1 diagrammatically shows the essential means of a system for data exchange, according to the invention, between point-of-sale checkout stations and a central server.

Each checkout station includes data acquisition means 1 connected to information processing means 2 including microprocessors 3 and memories 4 in which software is stored for signature and encryption and decryption of data, and authentication, non-repudiation and integrity of messages, which will be described in greater detail below.

The information processing means 2 also include working memories and an interface for connection to means 5 for accessing a data transmission network 6 such as the Internet, for example, for the transfer of data to a central server 7.

This essentially includes information processing means 8, comprising microprocessors 9 and memories 10 in which software is stored for data encryption and decryption, analysis of authentication and non-repudiation, integrity and acknowledgement of messages. These means 8 also include working memories and an interface for connection to means 11 for accessing the Internet 6.

The means of the system and the method for data exchange according to the invention will now be described in greater detail in reference to FIGS. 2 and 3, which are flow charts of the main functions implemented in the system of FIG. 1.

Figure 2:
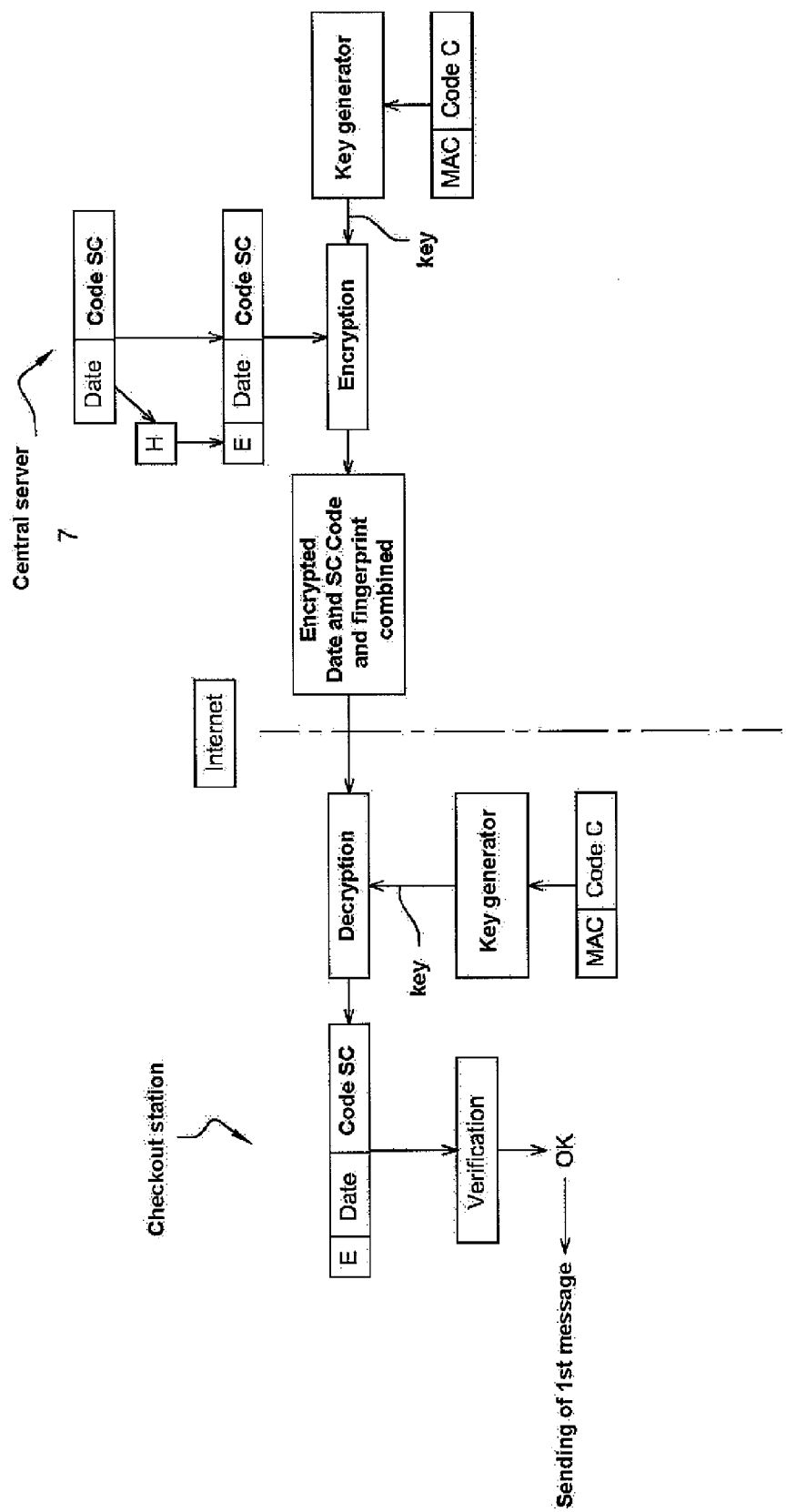
FIG. 2 is a flow chart of a phase for start-up of the method according to the invention.
Figure 3:
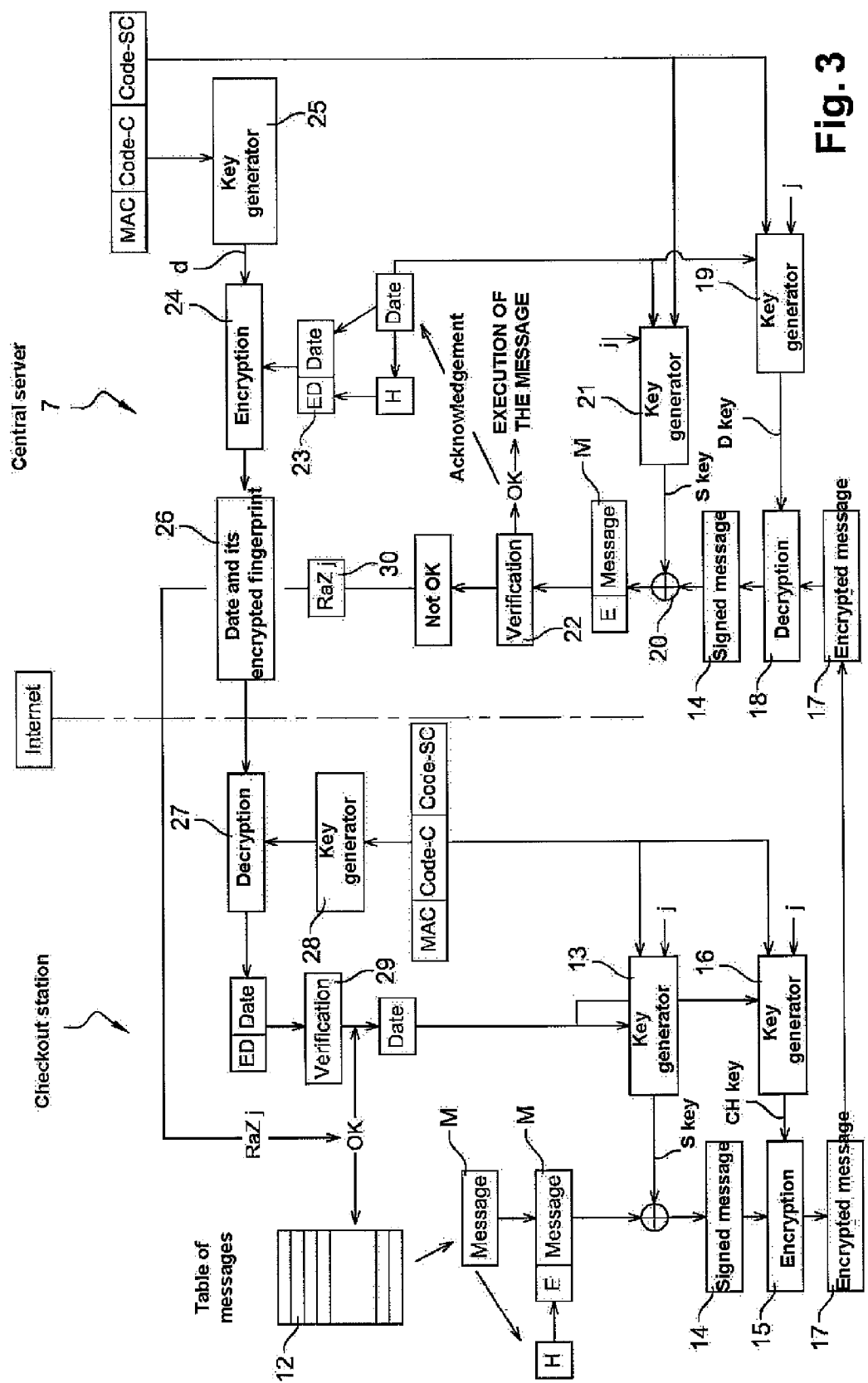
FIG. 3 is a flow chart of the essential steps of the method according to the invention, for a specific application in which the senders are point-of-sale checkout station terminals.

A data exchange between a checkout station and the central server essentially includes:

a start-up phase, shown in FIG. 2;

the sending of a message by the checkout station to the central server (for example, a specific information search or processing request by the central server), followed by the sending of an acknowledgement message by the central server to the checkout station (FIG. 3).

The start-up phase of FIG. 2 essentially includes, after connection of the checkout station and the central server and recognition of the IP address of the checkout station by the central server, the sending by the central server to the checkout station of an encrypted message including a date and a secret code SC specific to the central server. The date and the secret code are mixed, for example, by concatenation, and a fingerprint E is added to the resulting set, this fingerprint being obtained by hashing said set, for example by means of a hash algorithm H of the SHA (Secure Hash Algorithm) type.

The set E-date-SC is then encrypted in the central server, by means of an encryption algorithm, for example of the AES type with a CBC encryption mode, and an encryption key produced by a pseudo-random key generator on the basis of data including a secret code C specific to the checkout station and a symbolic code specific to the checkout station, for example its MAC (Media Access Control) address. These two data items have previously been stored in the central server and are, for example, part of a table of codes and addresses of checkout stations stored by any means on the central server. The key generator is a pseudo-random generator such as a one-way hash function, for example.

The encrypted data set E-date-SC is transmitted by the Internet to the checkout station, which is equipped with the same encryption means as the central server, i.e. a key generator and an encryption algorithm identical to those of the central server. The key generator of the checkout station produces a decryption key on the basis of the same secret code C and MAC address data as those used by the key generator of the central server. By means of this key, the encryption algorithm of the checkout station can decipher the message received and provide the set E-date-code SC in unscrambled mode. The fingerprint E makes it possible to verify the integrity of this message, and the date and SC code data are used to send encrypted messages to the central server as shown in FIG. 3.

The messages to be sent from the checkout station to the central server can be stored in a memory 12 (a message table) of the checkout station. Each message M to be sent is extracted from the table 12 and associated with a fingerprint E generated by applying a hash algorithm H to the message, with the fingerprint E having a reduced size with respect to that of the message. The hash algorithm H is, for example, of the SHA type (Secure Hash Algorithm), such as that used previously by the central server.

The fingerprint-message E-M set is then digitally signed, for the purposes of non-repudiation and authentication of the checkout station by the central server. For this, another hash function is used with the intervention of a secret key S (signature key), which is produced by a pseudo-random key generator 13 on the basis of fixed data including a MAC address code of the checkout station, the secret code C of the checkout station, and the secret code SC of the central server, and variable data including the date and an incremental operation number j, which characterise the processing of the message M in the subsequent sending of messages to be performed, and which change in each new message. The signature key S is thus changed in each operation, i.e. in each sending of a message.

The signed message 14 is then encrypted by means of an encryption algorithm 15, for example of the AES type with a CBC encryption code, and an encryption key CH produced by a pseudo-random key generator 16 of the type indicated above, on the basis of the same fixed and variable data as that applied to the signature key generator 13.

As the key generators 13 and 16 are one-way hash functions, it is virtually impossible to return to the data that enabled the keys to be produced.

The encryption key CH is thus modified in each sending of a message M, like the signature key S.

The encrypted message 17 is transmitted by the Internet to the central server. Upon receipt, it is deciphered by means of a decryption algorithm 18 and a secret decryption key D produced by a pseudo-random key generator 19 by means of the data already cited (MAC address of the checkout station, code C of the checkout station, SC code of the central server, the date and the operation number j). The decryption key generator 19 of the central server is a hash function identical to that of the encryption key generator 16 of the checkout station, and the two generators 18 and 19 are synchronised, by means of the operation number j, which is incremented by one unit in each new operation.

The result of the decryption 18 is the signed message 14 to which a hash function is applied in 20, with the intervention of an authentication key S produced by a pseudo-random key generator 21 corresponding to the signature key generator 13 of the checkout station and functioning with the same MAC address, code C and SC, date and operation number data, with the two key generators 13 and 21 being synchronised by means of the operation number j. It is thus verified that the message M indeed comes from the checkout station considered (the criterion of non-repudiation of the sender of the message received by the receiver is then satisfied) and the message M associated with the fingerprint E is obtained.

By means of the same hash algorithm as that H used in the checkout station, on the basis of the message M, a fingerprint is generated which is compared in 22 with that received E. If the comparison is positive, the criterion of integrity is considered to be satisfied, the message is executed in the central server and an acknowledgement message 23 is sent to the checkout station.

This acknowledgement message consists of a new date, corresponding to the date of the central server at this instant, and a corresponding fingerprint ED produced by a hash algorithm H applied to the new date. The date-fingerprint set is encrypted by means of an encryption algorithm 24 and a key d produced by a pseudo-random generator 25 on the basis of the MAC address of the checkout station and secret codes C of the checkout station and SC of the central server.

The encrypted acknowledgement message 26 is sent by the Internet to the checkout station where it is deciphered by means of a decryption algorithm 27 and a key produced by a pseudo-random generator 28 on the basis of the MAC address of the checkout station and the secret codes C and SC mentioned above.

The deciphered date data is processed by hashing to obtain a fingerprint that is compared to the fingerprint ED in 29. If the verification is positive, the new date replaces the previous date for the processing and sending of the next message to the receiver.

If the result of the comparison in 22 in the central server is negative, or if the central server did not receive anything from the checkout station after a given time period, for example, due to an interruption in the connection between the checkout station and the central server or a defective transmission of the encrypted data 17, the operation number j is reset to zero 30, which makes it possible to re-synchronise the key generators 13, 16, 19 and 21 in order to send new messages.

The different operations above are repeated until all of the messages of the table 12 have been transmitted to the central server.

The invention thus proposes a method and a system, which are entirely secure and interactive, for exchanging data between a sender such as, for example, a point-of-sale checkout station and a receiver such as a central sever, in particular via an Internet-type public telecommunications network. This method and this system satisfy the aforementioned criteria of authentication, confidentiality, non-repudiation, integrity and acknowledgement.

Although the invention has been described here in the context of a specific application in which messages must be transmitted from a checkout station to a central server, it also applies to all fields in which one or more sending systems or terminals exchange data with a receiving system or terminal, via a public or non-public telecommunications network.

Having described the invention, the following is claimed:

1. Method for exchange of encrypted data between a sender and a receiver, said method comprising:
   encrypting, in the sender, messages to be transmitted,
   sending the encrypted messages to the receiver by an Internet-type network,
   decrypting, in the receiver, the messages received, and
   sending an acknowledgement message to the sender, wherein the messages are encrypted by means of a symmetric secret key algorithm including:
   generating, in the sender and in the receiver, variable encryption/decryption keys, which are systematically modified in each encryption/decryption and which are produced by identical and synchronised encryption/decryption key generators installed in the sender and in the receiver, the variable encryption/decryption keys being generated on the basis of fixed data including secret codes specific to the sender and to the receiver and at least one data item that is systematically variable in each exchange, wherein the encryption and the decryption of the messages being performed without transmission of the variable encryption/decryption keys or data relating to the variable encryption/decryption keys between the sender and the receiver,
   wherein the acknowledgment message sent to the sender, after receiving and decryption of a message, includes an acknowledgement code, which is sent in encrypted form to the sender and which is used in the receiver, and after decryption in the sender, the acknowledgement code is used as a new data item associated with a synchronisation data item for the generation of a new variable encryption/decryption key.

2. Data exchange method according to claim 1, wherein:
   in the sender, signing each message before encryption, by using a signature key produced by a pseudo-random key generator, and
   in the receiver, authenticating the sender by using an authentication key produced by a pseudo-random key generator,
   wherein the pseudo-random key generators producing the signature and authentication keys are identical and synchronised.

3. Data exchange method according to claim 1, wherein the method further comprises:
   synchronising, by incrementation of said synchronisation data item, the encryption/decryption key generators or the pseudo-random key generators for producing signature and authentication keys, with said synchronisation data item being reset to the initial state if the connection between the sender and the receiver fails.

4. System for exchange of data between at least one sender and one receiver by means of an Internet-type data transmission network, wherein the sender and the receiver each include first means for encryption/decryption of messages, said first encryption/decryption means generating, on the basis of data including at least one variable data item and secret codes specific to the sender and the receiver, variable encryption/decryption keys that change for each new sending of a message from the sender to the receiver, with encryption and decryption of the messages being performed without transmission of the variable encryption/decryption keys or data relating to the variable encryption/decryption keys between the sender and the receiver,
   wherein an acknowledgment message sent to the sender, after receiving and decryption of a message, includes an acknowledgement code, which is sent in encrypted form to the sender and which is used in the receiver, and after decryption in the sender, the acknowledgment code is used as a new data item associated with a synchronisation data item for the generation of a new variable encryption/decryption key by the first encryption/decryption means.

5. Data exchange system according to claim 4, wherein the first encryption/decryption means of the sender and the receiver include pseudo-random key generators that are identical and synchronised.

6. Data exchange system according to claim 4, wherein the data used to generate the variable encryption/decryption keys include secret codes specific to the sender and the receiver and other data including symbolic codes specific to the sender and the receiver, with the secret codes being mixed with these other data by concatenation, before being applied to the first encryption/decryption means to generate the variable encryption/decryption keys.

7. Data exchange system according to claim 4, wherein the variable data item used to generate the variable encryption/decryption keys includes at least one data item that systematically changes in each exchange performed.

8. Data exchange system according to claim 4, wherein the variable data item used to generate said variable encryption/decryption keys includes at least one incremental operation number and means for resetting this number to its initial state if the sender-receiver connection is interrupted.

9. Data exchange system according to claim 4, wherein the receiver includes second means for encryption of its secret code and means for sending to the sender, by the network, a message including the encrypted secret code, with the sender being equipped with second means for decryption of the encrypted secret code and storing the secret code of the receiver.

10. Data exchange system according to claim 9, wherein the second encryption/decryption means include pseudo-random generators of encryption/decryption keys that are produced on the basis of data including a secret code specific to the sender and which has previously been stored in memories of the receiver and the sender.

11. Data exchange system according to claim 4, wherein the sender also includes means for signing each message transmitted to the receiver, for authentication of the sender upon receipt of a message by the receiver.

12. Data exchange system according to claim 11, wherein the signature means include a pseudo-random generator generating variable signature keys on the basis of the same data as that used to generate the variable encryption/decryption keys by the first encryption means.

13. Data exchange system according to claim 11, wherein the encryption of a message is performed after said message has been signed.

14. Data exchange system according to claim 12, wherein the receiver includes means for authenticating the sender, said means for authenticating including a pseudo-random generator generating variable keys on the basis of the same data as that used to generate the variable signature keys by the signature means.

15. Data exchange system according to claim 14, wherein the key generators of the signature means and the authentication means are synchronised by incrementation of a synchronisation data item, with this data item being reset to the initial state if the sender-receiver connection is interrupted.

16. Data exchange system according to claim 4, wherein the receiver includes means intended to generate, after receiving and decryption of a message sent by the sender, an encrypted acknowledgement message sent to the sender.

17. Data exchange system according to claim 16, wherein the acknowledgement message includes acknowledgement code including the date of the acknowledgement provided by the receiver, encrypted by means of a key produced by a key generator on the basis of the data used to generate the variable encryption/decryption keys by the first encryption/decryption means.

18. Data exchange system according to claim 17, wherein the sender includes means for decryption of the acknowledgement message sent by the receiver, using a decryption key produced by a key generator on the basis of data used to generate the variable encryption/decryption keys by the first encryption/decryption means.

19. Data exchange system according to claim 4, wherein the data exchange system includes means for checking the non-repudiation and integrity of a message transmitted, by adding to the message, in the sender, a fingerprint obtained by hashing the message and by verifying by means of the fingerprint, in the receiver, the length of the message after decryption.

20. Data exchange system according to claim 5, wherein the pseudo-random key generators include one-way hash functions.

* * * * *